US010702921B2

(12) United States Patent
Volk

(10) Patent No.: US 10,702,921 B2
(45) Date of Patent: Jul. 7, 2020

(54) ADDITIVE MANUFACTURING SYSTEM EMPLOYING PRE-FABRICATED COMPONENT BRACING

(71) Applicant: Incodema3D, LLC, Ithaca, NY (US)

(72) Inventor: Scott Volk, Ithaca, NY (US)

(73) Assignee: Incodema3D, LLC, Freeville, NY (US)

( * ) Notice: Subject to any disclaimer, the term of this patent is extended or adjusted under 35 U.S.C. 154(b) by 333 days.

(21) Appl. No.: 15/423,800

(22) Filed: Feb. 3, 2017

(65) Prior Publication Data
US 2017/0225227 A1 Aug. 10, 2017

Related U.S. Application Data

(60) Provisional application No. 62/291,800, filed on Feb. 5, 2016.

(51) Int. Cl.
*B29C 64/40* (2017.01)
*B29C 64/153* (2017.01)
*B22F 3/105* (2006.01)
*B33Y 10/00* (2015.01)
*B33Y 30/00* (2015.01)
*B23K 26/342* (2014.01)
*B23K 26/70* (2014.01)
*B23K 26/08* (2014.01)
*B22F 5/04* (2006.01)

(52) U.S. Cl.
CPC .......... *B22F 3/1055* (2013.01); *B23K 26/083* (2013.01); *B23K 26/342* (2015.10); *B23K 26/702* (2015.10); *B29C 64/153* (2017.08); *B29C 64/40* (2017.08); *B33Y 10/00* (2014.12); *B33Y 30/00* (2014.12); *B22F 5/04* (2013.01); *B22F 2003/1058* (2013.01); *Y02P 10/295* (2015.11)

(58) Field of Classification Search
CPC ..................................................... B29C 64/40
See application file for complete search history.

(56) References Cited

U.S. PATENT DOCUMENTS

| 6,042,774 A | * | 3/2000 | Wilkening | ............. B23K 26/34 264/497 |
| 2013/0112366 A1 | * | 5/2013 | Mottin | ...................... B22F 5/04 164/494 |
| 2014/0333011 A1 | | 11/2014 | Javidan et al. | |

FOREIGN PATENT DOCUMENTS

| DE | 102013214485 A1 | 2/2015 |
| EP | 3023177 A1 | 5/2016 |

OTHER PUBLICATIONS

DE-102013214485-A1, Clemen Carsten (English translation) (Year: 2015).*

(Continued)

*Primary Examiner* — Timothy Kennedy
*Assistant Examiner* — Farah Taufiq
(74) *Attorney, Agent, or Firm* — Fish & Richardson P.C.

(57) ABSTRACT

A system is disclosed for use in manufacturing a component. The system may have a build chamber, a stage movable within the build chamber, and a recoater configured to deposit a layer of powdered material on top of the stage. The system may also have an energy source configured to direct a beam onto the layer of powdered material in a pattern corresponding to a shape of the component, and a brace fabricated before manufacturing of the component. The brace may be located adjacent a periphery of the component and extend from the stage toward the recoater.

12 Claims, 3 Drawing Sheets

(56) References Cited

OTHER PUBLICATIONS

International Search Report and Written Opinion dated May 23, 2017 in PCT/US2017/016488 (13 pages).

* cited by examiner

ADDITIVE MANUFACTURING SYSTEM EMPLOYING PRE-FABRICATED COMPONENT BRACING

RELATED APPLICATIONS

This application is a continuation of, and claims the benefit of priority to, Provisional Application No. 62/291,800 filed on Feb. 5, 2016, the contents of which are expressly incorporated herein by reference.

TECHNICAL FIELD

The present disclosure relates generally to an additive manufacturing system and, more particularly, to an additive manufacturing system employing bracing that is fabricated before fabrication of an associated component.

BACKGROUND

Additive manufacturing is a process of creating three-dimensional components by depositing overlapping layers of material under the control of a computer. One technique of additive manufacturing is known as direct metal laser sintering (DMLS). The DMLS technique uses a laser to direct a high-energy beam into a powdered metal medium at precise locations corresponding to features and dimensions of the component to be manufactured. As the energy beam contacts the powdered metal, the powdered metal is caused to melt and weld together and to previously melted layers of the component.

Conventional DMLS systems include a build chamber having a stage that is movable in a vertical direction, and an adjacent material chamber that holds the powdered metal. A recoater in the shape of a blade or a roller pushes powdered metal from the material chamber across the stage in the build chamber, thereby depositing a layer of the powdered metal of a desired thickness. After welding of the powdered metal by the laser (a.k.a., printing a layer of the component), the stage is lowered by an amount equal to a thickness of the next layer, and the process is repeated.

Although the conventional DMLS system produces components suitable for some applications, the system can also be problematic. In particular, as the recoater pushes material across the stage and the upper layer of the component in preparation for a subsequent melting event, the recoater exerts lateral forces on the component due to friction generated within the powdered metal. When manufacturing a component having a low aspect ratio (e.g., a small width-to-height ratio), these lateral forces have the potential to cause deformation or breakage of the component.

The conventional approach to reducing deformation or breakage of a low-aspect-ratio component is to simultaneously print sacrificial support structure around the component. This structure increases the aspect ratio of the component, thereby also increasing a lateral strength of the component. After manufacturing of the component and support structure is complete, the support structure is removed (e.g., etched, ground, and/or broken away from the component). While the conventional approach to reducing component deformation or breakage may be functionally adequate, the support structure is also resource (e.g., time and material) expensive.

An alternative method of providing support structure is disclosed in U.S. Patent Application Publication No. 2014/0333011 (the '011 publication) of Javidan et al. that published on Nov. 13, 2014. In particular, the '011 publication discloses an additive manufacturing method (e.g., a laser sintering method) used to create a three-dimensional object. The method includes forming a structure having multiple intersecting walls, and then inserting a prefabricated support piece into an interior cavity between the walls. Additional material is laid down on top of the walls and the support piece to create an overhang extending from the walls across the interior cavity. The support piece partially supports the overhang while the material cures to a solid state, thereby reducing a need to print support structure. The support piece is re-usable, thereby reducing material waste.

Although the method of the '011 publication may help to reduce resource wasting associated with an additive manufacturing process, application of the method may be limited. Specifically, the method may only be applicable to creation of an overhang. In addition, the method may provide little, if any, lateral strength increase to a component having a low-aspect ratio.

The disclosed additive manufacturing system is directed to overcoming one or more of the problems set forth above and/or other problems of the prior art.

SUMMARY

In one aspect, the present disclosure is directed to a system for manufacturing a component. The system may include a build chamber, a stage movable within the build chamber, and a recoater configured to deposit a layer of powdered material on top of the stage. The system may also include an energy source configured to direct a beam onto the layer of powdered material in a pattern corresponding to a shape of the component, and a brace fabricated before manufacturing of the component. The brace may be located adjacent a periphery of the component and extend from the stage toward the recoater.

In another aspect, the present disclosure is directed to another system for manufacturing a plurality of components. This system may include a build chamber, a stage movable within the build chamber, and a recoater configured to deposit a layer of powdered material on top of the stage. The system may also include an energy source configured to direct a beam onto the layer of powdered material in a pattern corresponding to shapes of the plurality of components, and a plurality of braces fabricated before manufacturing of the plurality of components. Each of the plurality of braces may be located adjacent a periphery of a corresponding one of the plurality of components and extend from the stage toward the recoater. The stage may include a plurality of openings, and each of the plurality of braces may be configured to slide through a corresponding one of the plurality of openings as the stage moves toward the recoater. Each of the plurality of braces may extend a first distance away from the stage that is less than a second distance between an exposed surface of the layer and the stage, and a gap may be maintained between each of the plurality of braces and the periphery of the corresponding one of the plurality components.

In yet another aspect, the present disclosure is directed to a method of manufacturing a component. The method may include locating a brace adjacent a periphery of the component, and depositing a layer of powdered material. The method may also include directing an energy beam onto the layer of powdered material in a pattern corresponding to a shape of the component. The brace may be fabricated before manufacturing of the component, and extend in a direction normal to the layer of powdered material.

DETAILED DESCRIPTION

Figure 1:
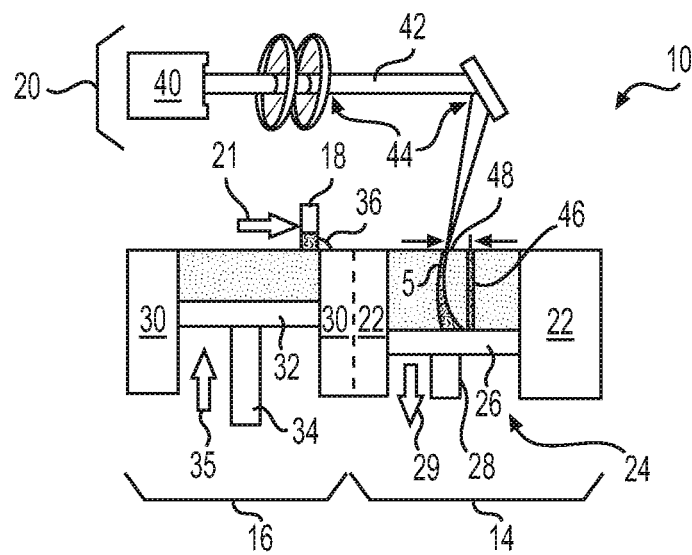
FIGS. 1-3 are diagrammatic illustrations of exemplary disclosed additive manufacturing systems.

FIG. 1 illustrates a component 5 that is being additively manufactured by an exemplary system 10. Although component 5 may be fabricated from any type of material to have any desired shape, for the purposes of this disclosure, component 5 is depicted as a metallic component (e.g., a turbine blade or diffuser fin) having a low-aspect-ratio. A low aspect ratio may be considered a ratio of about 1:2 or lower. Accordingly, component 5 may have a cross-sectional width or diameter that is about one-half of its height, or less. Any type of metal known in the art may be used to manufacture component 5.

System 10 may take many different forms. In the disclosed embodiment, system 10 is a direct metal laser sintering type of system having a build chamber 14, a material chamber 16, a recoater 18, and an energy source 20. As will be explained in more detail below, recoater 18 may push powdered material from material chamber 16 into build chamber 14 (in a direction indicated by an arrow 21), and energy source 20 may selectively generate (e.g., melt) a pattern in the powder to produce layers of solidified material forming component 5. It is contemplated that system 10 could include additional components not shown in FIG. 1, if desired. For example, system 10 could additionally include a housing surrounding build and/or material chambers 14, 16 and having a controlled environment (e.g., a vacuum environment or a pressurized inert gas environment), cooling and/or heating circuits, a user interface, a controller in communication with the various parts of system 10, etc. It is also contemplated that system 10 could embody another type of additive manufacturing system (e.g., a vat photopolymerization system, a material jetting system, a binder jetting system, a material extrusion system, a directed energy deposition system, or another system), if desired.

Build chamber 14 may be configured to house and support component 5 during fabrication thereof. In the disclosed example, build chamber 14 is formed by a plurality of connected walls 22 and a movable stage 24. Walls 22 may surround component 5 on all sides, and stage 24 may function as a floor of build chamber 14 on which component 5 is built. Stage 14 may consist of a platform 26, and one or more actuators 28 that are connected to a bottom of platform 26 opposite component 5. Platform 26 may be generally plate-like and oriented in a horizontal plane parallel to the trajectory of recoater 18, and actuator(s) 28 may be configured to move platform 26 vertically (i.e., in a direction indicated by an arrow 29) between walls 22 within build chamber 14. Specifically, actuator(s) 28 may be controlled to incrementally step down platform 26 relative to walls 22 after fabrication of each layer of component 5. The amount that platform 26 is stepped down may be about equal to a thickness of each of layer, such that recoater 18 may remain at a relatively fixed horizontal location during each pass across stage 14. Actuator(s) 28 may include, for example, motors, cylinders, valves, solenoids, etc.

Material chamber 16 may be similar in form to build chamber 14. In particular, material chamber 16 may also include a plurality of connected walls 30, a platform 32, and one or more actuators 34 connected to a bottom of platform 32. However, instead of walls 30 surrounding and platform 32 supporting a component, walls 30 may instead surround a supply of powdered material used to manufacture component 5 and platform 32 may support the material. Actuator(s) 34 may be configured to selectively raise platform 32 (in a direction indicated by an arrow 35) as the material inside material chamber 16 is consumed. In particular, actuator(s) 34 may be controlled to incrementally step up platform 32 relative to walls 30 after recoater 18 pushes a layer of material away from material chamber 14 and into build chamber 16. The amount that platform 32 is stepped up may be equal to or greater than a thickness of each of layer of component 5, such that more than enough material is provided to recoater 18 during each pass across stage 14. Actuator(s) 34 may include, for example, motors, cylinders, valves, etc. It should be noted that build chamber 14 and material chamber 16 may share a common wall in some embodiments.

Recoater 18 may be available in several different forms and configured to move in different ways. In a first example shown in FIG. 1, recoater 18 is an elongated blade or arm that is movable (e.g., translatable by way of one or more actuators—not shown) in the direction of arrow 21. The length direction of recoater 18 may extend generally orthogonal to its travel direction (i.e., out of the page in the perspective of FIG. 1), and the actual length of recoater 18 may be sufficient to extend entirely across openings formed inside of walls 22 and walls 30. With this configuration, as recoater 18 moves across material chamber 16 (e.g., from left to right), recoater 18 may engage the powdered material therein, which has been previously elevated above a bottom surface of recoater 18 by platform 32 and actuator(s) 34. As recoater 18 scrapes across the material, a ridge 36 of the material may be collected at its leading edge. Then, as recoater 18 moves across build chamber 14, material from ridge 36 may fall down onto an earlier fabricated layer of component 5, which has been previously lowered below the bottom surface of recoater 18 by platform 26 and actuator(s) 28. In the embodiment of FIG. 1, recoater 18 is configured to move material in only a single direction (i.e., in the direction of arrow 21). After completing this movement, recoater 18 may be returned to a starting side (i.e., the left side relative to the perspective of FIG. 1) of material chamber 16 in preparation for manufacturing a next layer of component 5. The pushing of material by recoater 18 over the earlier fabricated layer of component 5 in the direction of arrow 21 may generate frictional forces in the same general direction acting on an exposed end of component 5.

Figure 2:
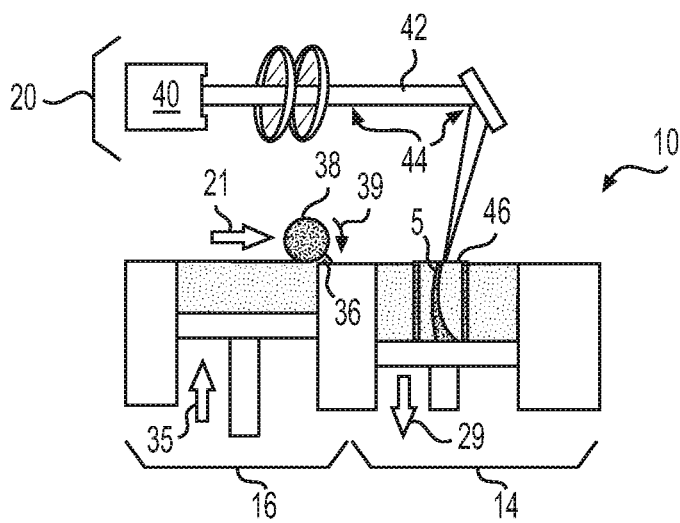

In an alternative embodiment shown in FIG. 2, system 10 utilizes a different recoater 38. In this embodiment, recoater 38 has a roller configuration. Similar to recoater 18, recoater 38 may move from the left side (relative to the perspective shown in FIG. 2) of material chamber 16 to the right side of build chamber 14 to push ridge 36 of powdered material across an earlier fabricated layer of component 5. However, in contrast to the embodiment of FIG. 1, recoater 38 of FIG. 2 additionally rolls (e.g., in a direction indicated by an arrow 39) across the deposited material. This rolling may be driven by a dedicated actuator (not shown) or may simply be the result of translational movement of recoater 38 in the direction of arrow 21 and a peripheral resistance to the movement by the deposited material in a direction opposite to arrow 21. In either situation, in addition to generating frictional forces generally aligned with arrow 21, in some embodiments, recoater 38 may additionally generate downward forces generally aligned with arrow 29 that function to compress the deposited material somewhat.

In the disclosed examples, energy source 20 includes one or more lasers 40 (e.g., an Excimer laser, a Yb:tungstate laser, a $CO_2$ laser, a Nd:YAG laser, a DPSS laser, or another type of laser known in the art) that are configured to generate one or more beams of energy 42 directed onto the layer of powdered material after deposition by recoater 18. Beam 42 may be capable of heating the powdered material to a level sufficient to sinter (i.e., to coalesce the powdered material into a porous state) or otherwise harden the powdered material. In some embodiments, various optics (e.g., lenses, mirrors, gratings, filters, etc.) 44 may be used to focus, redirect, and/or align beam(s) 42 with a desired pattern on the powdered material, thereby generating a required shape and contour of component 5 corresponding to a height (e.g., a distance away from platform 26) of the layer currently being manufactured. It is contemplated that energy sources other than lasers (e.g., ultraviolet light sources, electromagnetic energy sources, chemical energy sources, etc.) could alternatively be used to sinter or harden the material, if desired.

Figure 3:
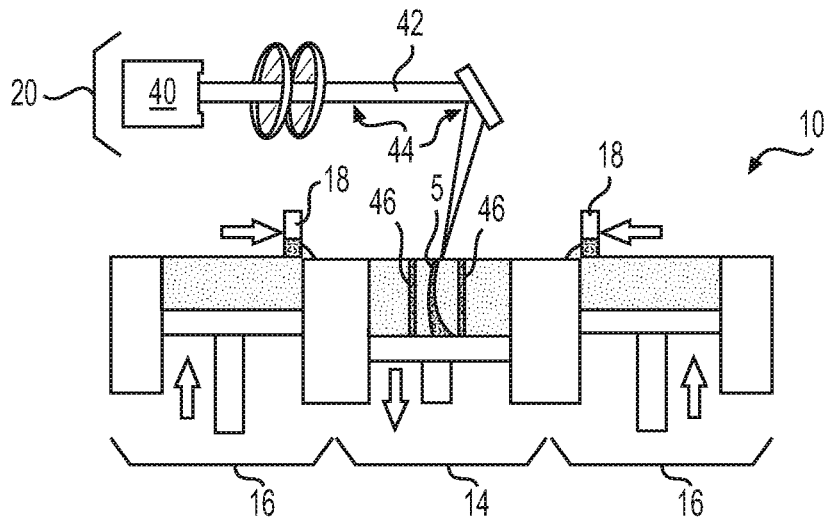

FIG. 3 illustrates another exemplary embodiment of system 10. Like the embodiments of FIGS. 1 and 2, system 10 of FIG. 3 includes build chamber 14, material chamber 16, and energy source 20. System 10 of FIG. 3 can also include recoater 18 illustrated in the embodiment of FIG. 1, or recoater 38 illustrated in the embodiment of FIG. 2. However, in contrast to these other embodiments, system 10 of FIG. 3 includes at least one additional material chamber 16, such that build chamber 14 is sandwiched between two material chambers 16. In addition, the particular recoater used in the embodiment of FIG. 3 (recoater 18 or recoater 38) may be capable of depositing powdered material within build chamber 14 during movement in two different directions. Specifically, the particular recoater may move from the left side of the left-most material chamber 16 completely across build chamber 14 and the right side of the right-most material chamber 16, pushing material from the left-most material chamber 16 into build chamber 14 during fabrication of a first component layer. Then during manufacturing of a next layer of component 5, the particular recoater may move from the right side of the right-most material chamber 16 completely across build chamber 14 and the left side of the left-most material chamber 16, pushing material from the right-most material chamber 16 into build chamber 14. While this configuration may provide for faster and/or more efficient manufacturing of component 5, the bi-directional movement of the recoater may additionally generate bi-directional frictional forces on the exposed end of component 5.

If left unchecked, the frictional and/or compressive forces generated by recoaters 18 and 38 on a low-aspect component 5 could result in deformation and/or breakage of component 5. For this reason, one or more prefabricated braces 46 may be selectively utilized in each of the system embodiments of FIGS. 1-3 to help support component 5 during manufacturing. Braces 46 may be available in different sizes and shapes, and located in different positions around a periphery of component 5, depending on the forces anticipated to be exerted by recoater 18 or 38.

In the example of FIG. 1, a single brace 46 is utilized and located at a trailing side of component 5, relative to the travel direction of recoater 18 (i.e., relative to the direction of forces generated by recoater 18 during travel aligned with arrow 21). Brace 46, in this embodiment, may be a simple cylindrical post or wall extending from the planar surface of platform 26 in a normal direction. As a post, brace 46 may be generally aligned with component 5 along the direction of arrow 21. As a wall, brace 46 may be aligned with component 5, or alternatively oriented generally orthogonal to the direction of arrow 21. A diameter, width, and/or shape of brace 46 may vary, and be based on a shape and size of component 5. Brace 46 may be located close enough to the periphery of component 5 to inhibit significant deflection (i.e., deflection large enough to render component 5 no longer useful), but also spaced apart from the periphery of component 5 by a gap 48 having a size sufficient to inhibit bonding of component 5 to brace 46 during sintering. It should be noted that an extension distance of brace 46 away from platform 26 should be less than a distance between an exposed surface of the current layer being manufactured and an upper surface of platform 26, such that brace 46 does not interfere with movement of the associated recoater 18 or 38.

In the example of FIG. 3, two braces 46 are utilized and located at both the trailing side and a leading side of component 5 (e.g., in opposition to the bi-directional forces generated by recoater 18 during travel in opposing directions). Braces 46, in this embodiment, may be simple cylindrical posts and/or walls aligned with or oriented generally orthogonal to the direction of arrow 21.

In the example of FIG. 2, a single brace 46 is utilized and located to completely surround component 5. Brace 46 is hollow in this example, and may have a round cross-section, a square cross-section, a triangular cross-section or another cross-sectional shape. By completely surrounding component 5, brace 46 may increase a resistance of component 5 to both the lateral and compressive forces generated by the rolling recoater 38.

Figure 4:
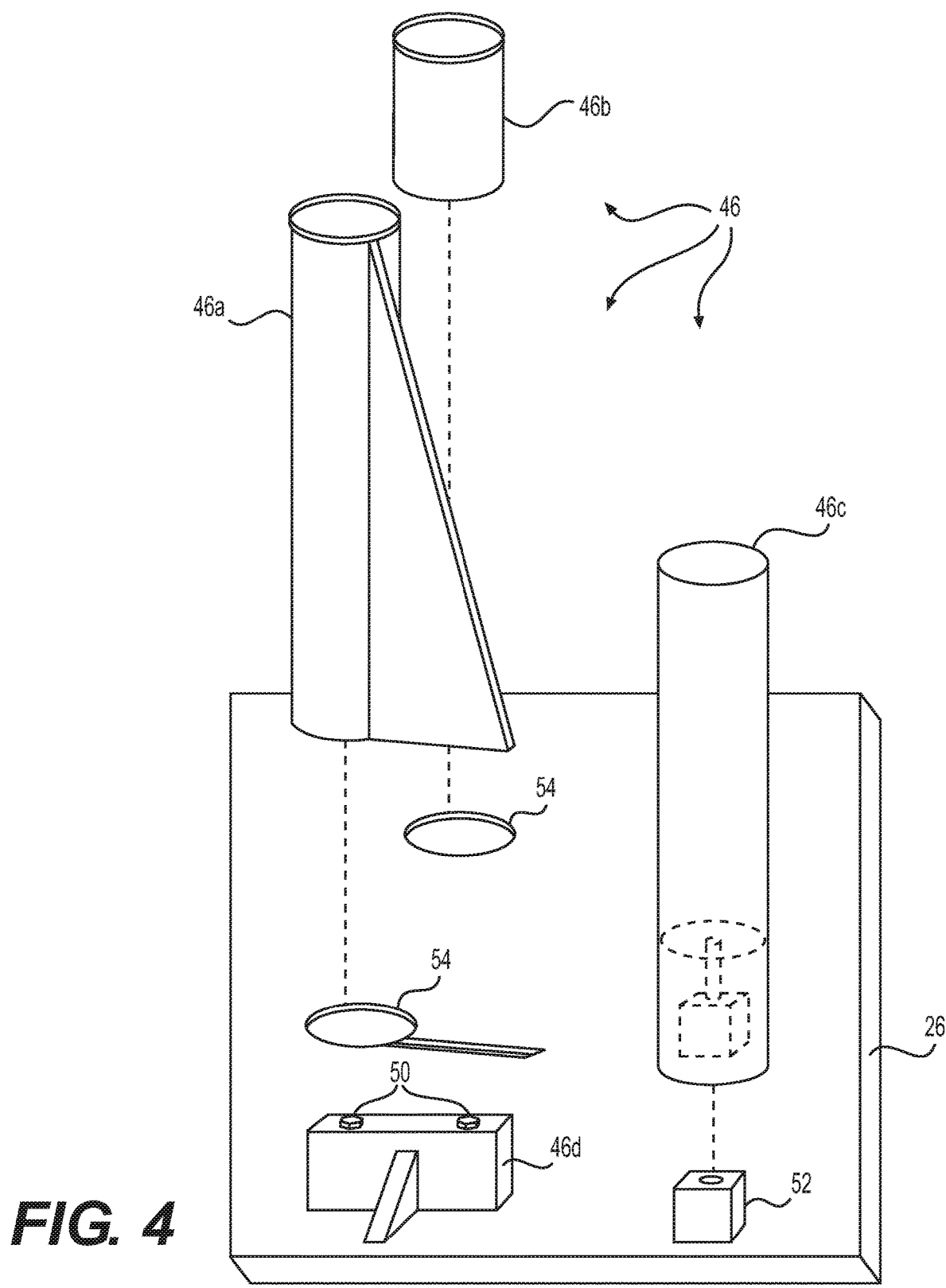
FIG. 4 is an isometric illustration of an exemplary disclosed stage assembly that may be used in conjunction with the additive manufacturing systems of FIGS. 1-3.

FIG. 4 illustrates exemplary embodiments 46a, 46b, 46c, and 46d of brace 46, and possible ways that brace 46 may interact with platform 26. While the examples of FIG. 4 illustrate multiple braces 46 simultaneously connectable to platform 26, it should be noted that any number of braces 46 (e.g., a single brace 46) may be utilized to support one or more components 5 during a particular manufacturing event.

As shown in FIG. 4, brace 46 may be cylindrical (see braces 46b and 46c), solid (see brace 46c), hollow (see brace 46b), wall-like (see brace 46d), or include any combination (see brace 46a) of these features (as well as other features that are not shown). In some embodiments (see braces 46c and 46d), braces 46 may be configured to connect directly to platform 26, such that braces 46 and platform 26 are movable together by actuator(s) 28 (referring to FIGS. 1-3). These connections may be facilitated by way of fasteners 50 and/or inserts 52 that are integral to (e.g., welded to or printed on) platform 26. It should be noted that braces 46, when connected directly to platform 26, may be selectively removed from platform 26 without part destruction, cutting, grinding, or another invasive procedure. In this way, braces 46 may be re-usable and interchangeable with different platforms 26 and components 5. It is contemplated that the directly-connected braces 46 may be fixed to platform 26 prior to a start of a manufacturing process (e.g., prior to sintering of a first layer of component 5), or alternatively fixed to platform 26 partway through the process (e.g., after one or more layers have been sintered), as desired.

In other embodiments, braces 46 may be configured to move relative to platform 26, such that braces 46 grow (i.e., extend from platform 26 by a greater amount) as platform 26 is incrementally lowered within build chamber 16. This connection may be facilitated, for example, by way of slots or openings 54 formed through platform 26 and having a profile corresponding to a cross-sectional profile of the associated braces 46. In this configuration, base ends of braces 46 may be fixedly connected to system 10 at a location below platform 26, with distal ends extending through slots 54, such that braces 46 remain substantially stationary during movement of platform 26.

Figure 5:
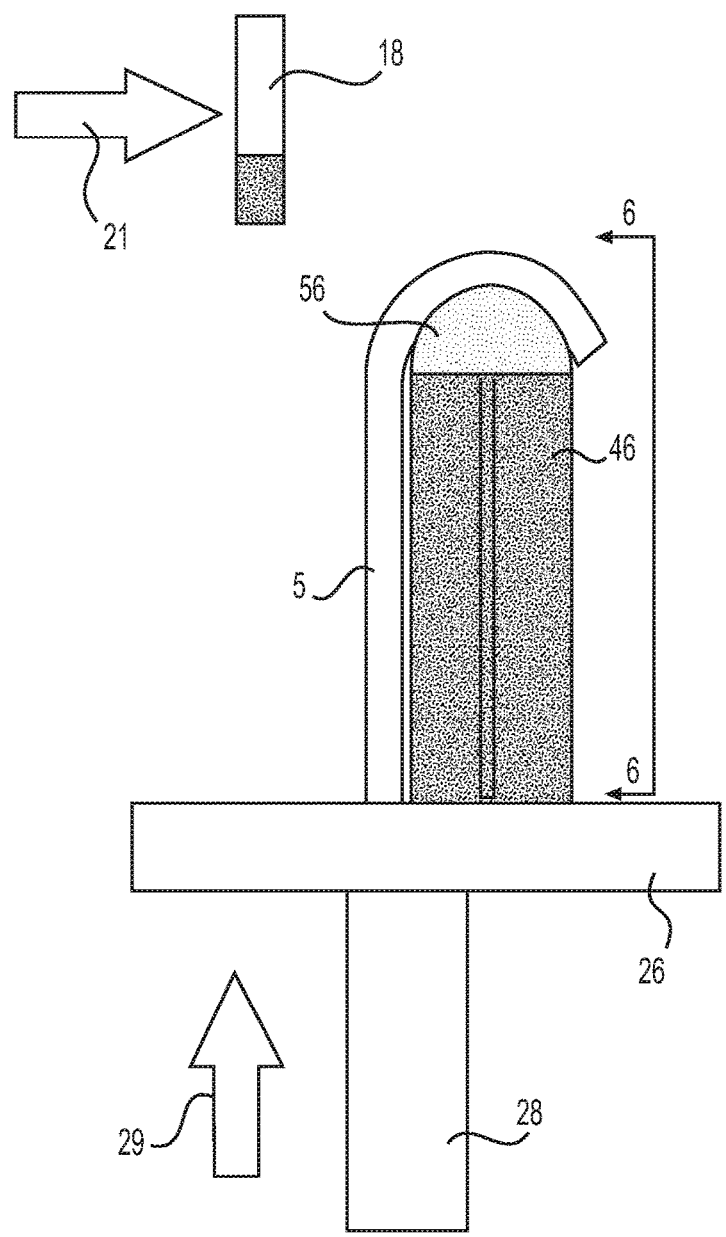
FIGS. 5 and 6 are isometric illustrations of exemplary disclosed bracing that may form a portion of the stage assembly of FIG. 4.
Figure 6:
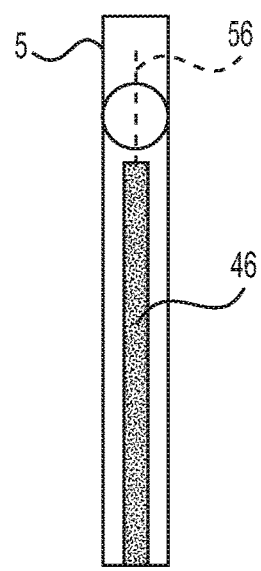

FIGS. 5 and 6 illustrate an alternative embodiment of brace 46 and/or an alternative use of an existing embodiment of brace 46. In this embodiment, brace 46 is generally wall-like, fixedly connected to platform 26, and oriented in general alignment with the travel direction of recoater 18, as indicated by arrow 21. Like the other brace configurations described above, this configuration, location, and orientation of brace 46 may function to increase an aspect ratio (and thereby a strength) of component 5. However, in contrast to previous embodiments, the distal end of brace 46 (i.e., the end located away from platform 26) may also function as a base for additional support structure 56. Support structure 56 may be temporary, and formed at the same time that component 5 is being formed. In particular, support structure 56 may be manufactured from the same powdered material used to also manufacture component 5, and sintered using the same energy source 20. Support structure 56 may be manufactured layer-by-layer, in the same way and at the same time as layers of component 5 are being manufactured. These layers of support structure 56 may extend from brace 46 (e.g., from the distal end of brace 46) to the periphery of component 5, thereby connecting brace 46 to component 5. By using brace 46 as a base for support structure 56, an amount of support structure 56 required to adequately support component 5 may be reduced. In addition, support structure 56 may be used to support an overhanging portion of component 5 (as shown in FIGS. 5 and 6), or to support component 5 in another manner (e.g., to increase a resistance to the lateral forces exerted by recoater 18 or 38 on component 5). It is contemplated that support structure 56 may have the same general shape and size as base 46 (e.g., support structure 56 may be wall-like with a thickness and width about the same as brace 46), or a different shape and size, as desired. Support structure 56 may be removable (e.g., etched, ground, broken away) from component 5 and brace 46 after completion of component 5. In this manner, brace 46 may still be re-usable. It should be noted that any type of brace 46 having any shape and size may be utilized as a base for support structure 56, as desired.

INDUSTRIAL APPLICABILITY

The disclosed systems may be used to manufacture any type of component in an additive manner. The disclosed systems may be particularly useful in manufacturing metallic components having a low aspect ratio. The disclosed systems may be capable of manufacturing such components with increased accuracy, efficiency, and/or profitability, by reducing component rejection and waste. Operation of system 10 will now be described with respect to FIGS. 1-3.

At a start of a manufacturing event, information regarding component 5 may be loaded into system 10, as is known in the art. This information may include a shape, a size, a contour, etc. of component 5. Based on the component information (e.g., based on a width and a height of the component 5 to be manufactured), one or more braces 46 may be connected to platform 26 in build chamber 16. As described above, brace(s) 46 may be located behind an anticipated periphery of component 5 relative to the travel direction of recoater 18 or 38, in front of component 5, and/or around component 5, as desired. In addition, the connection of brace(s) 46 with platform 26 may be a fixed connection or a movable connection.

This component information may then be used to control operation of build chamber 14, material chamber(s) 16, recoater 18 or 38, and energy source 20. For example, platform 26 may be lowered by actuator(s) 28 in an amount corresponding to a desired thickness of a first layer of component 5. At about the same time, platform 32 may be raised by at least this same thickness. Thereafter, recoater 18 or recoater 38 may be driven by associated actuator(s) to push material extending from material chamber 16 above a lower edge of the corresponding recoater into build chamber 14. The material may be spread across platform 26 in a relatively consistent and well-distributed manner. Thereafter, energy source 20 may be activated to sinter the powdered material in a pattern corresponding to the size, shape, and/or contour of component 5 at the particular height above platform 26. Platform 26 may then be lowered by a thickness of a second layer of component 5, and the process may be repeated.

In one embodiment, after enough layers of component 5 have been manufactured, fabrication of support structure 56 may begin. In particular, at a time when additional support for component 5 is deemed appropriate (e.g., when the sintered layers of component 5 have reached the distal end or another desired height of brace 46), beam 42 of laser 40 may be caused to follow a combined pattern of both component 5 and support structure 56. This pattern may extend to and/or across brace 46, such that brace 46 becomes connected to component 5 by way of support structure 56.

In the same or an alternative embodiment, one or more braces 46 may be connected to platform 26 after some of component 5 has already been manufactured. For example, it may be that brace 46 is not required until the as-built aspect ratio of component 5 falls below a predetermined threshold or until another similar condition is satisfied. Brace 46 may then be pushed down through already-deposited, but not yet sintered, powdered material in build chamber 14. In some instances, brace 46 may only rest on platform 26 at this time. In other instances, brace 46 may be connected to platform 26 in a fixed or movable manner. Manufacturing of component 5 may then recommence as outlined above.

After completion of component 5, bracing 46 may be removed. In particular, platform 26 may be raised up, relative to walls 22, such that component 5 is accessible to a user of system 10. Unsintered powdered material may then be removed from around component 5 and/or brace 46 (e.g., vacuumed or blown away). Any manufactured support structure 56 may be removed, and component 5 and bracing 46 may be disconnected from platform 26. Component 5 may then undergo any required post-processing, while bracing 46 may be re-used for manufacturing of the same type or a different type of component 5. It is contemplated that bracing 46 may remain connected to platform 26 between manufacturing events, if desired.

The use of bracing 46 may improve an accuracy and a profitability associated with manufacturing of component 5. In particular, the accuracy of component 5 may be improved via a reduced deflection of component features during manufacturing caused by the friction and/or compression forces of recoater 18 or 38. In addition, there may be fewer instances of component 5 breaking and being rejected for its intended purpose. Further, less support structure 56 may be require manufacturing during each event, and braces 46 may be re-usable. All of these things may help to reduce manufacturing time and material, thereby improving a profitability of the manufacturing process.

It will be apparent to those skilled in the art that various modifications and variations can be made to the disclosed additive manufacturing system. Other embodiments will be apparent to those skilled in the art from consideration of the specification and practice of the disclosed additive manufacturing system. It is intended that the specification and examples be considered as exemplary only, with a true scope being indicated by the following claims and their equivalents.

What is claimed is:

1. A system for manufacturing a component, comprising:
   a build chamber;
   a stage movable within the build chamber;
   a recoater configured to deposit a layer of powdered material on top of the stage;
   an energy source configured to direct a beam onto the layer of powdered material in a pattern corresponding to a shape of the component; and
   a brace fabricated before manufacturing of the component and having a fixed size during the manufacturing of the component, the brace extending from the stage toward the recoater and being configured to surround the component and not to contact the component as the component is being manufactured.

2. The system of claim 1, wherein:
   the stage includes an opening; and
   the brace is configured to slide through the opening as the stage moves toward the recoater.

3. The system of claim 1, wherein the brace is connected to move with the stage.

4. The system of claim 1, wherein:
   the recoater is configured to move in a first direction across the stage; and
   the brace is located in alignment with the first direction at a trailing side of the component.

5. The system of claim 4, wherein:
   the brace is a first brace; and
   the system further includes a second brace located in alignment with the first direction at a leading side of the component.

6. The system of claim 1, wherein:
   the recoater is configured to move in a first direction across the stage; and
   the brace is a wall oriented substantially orthogonal to the first direction.

7. The system of claim 1, wherein a gap is maintained between a periphery of the component and the brace.

8. The system of claim 1, wherein the brace forms a base for deposition of a temporary support structure extending between the brace and the component.

9. The system of claim 1, wherein the brace extends a first distance away from the stage that is less than a second distance between an exposed surface of the layer and the stage.

10. The system of claim 1, wherein:
    the component is a first component;
    the brace is a first brace; and
    the system further includes a second brace fabricated before manufacturing of a second component, the second brace extending from the stage toward the recoater and being configured not to contact the component as the component is being manufactured.

11. A system for simultaneously manufacturing a plurality of components, comprising:
    a build chamber;
    a stage movable within the build chamber;
    a recoater configured to deposit a layer of powdered material on top of the stage;
    an energy source configured to direct a beam onto the layer of powdered material in a pattern corresponding to shapes of the plurality of components; and
    a plurality of braces fabricated before manufacturing of the plurality of components and having a fixed size during the manufacturing of the components, each of the plurality of braces being located adjacent a periphery of a corresponding one of the plurality of components and extending from the stage toward the recoater,
    wherein:
      the stage includes a plurality of openings;
      each of the plurality of braces is configured to slide through a corresponding one of the plurality of openings as the stage moves toward the recoater and is configured to surround a corresponding component and not to contact the corresponding component as the components are being manufactured;
      each of the plurality of braces extends a first distance away from the stage that is less than a second distance between an exposed surface of the layer and the stage; and
      a gap is maintained between each of the plurality of braces and the periphery of the corresponding one of the plurality components.

12. A system for manufacturing a component, comprising:
    a build chamber;
    a stage movable within the build chamber;
    a recoater configured to deposit a layer of powdered material on top of the stage;
    an energy source configured to direct a beam onto the layer of powdered material in a pattern corresponding to a shape of the component; and
    a brace fabricated before manufacturing of the component and having a fixed size during the manufacturing of the component, the brace extending from the stage toward the recoater and configured to surround the component as the component is being manufactured.

* * * * *